Figure 1:
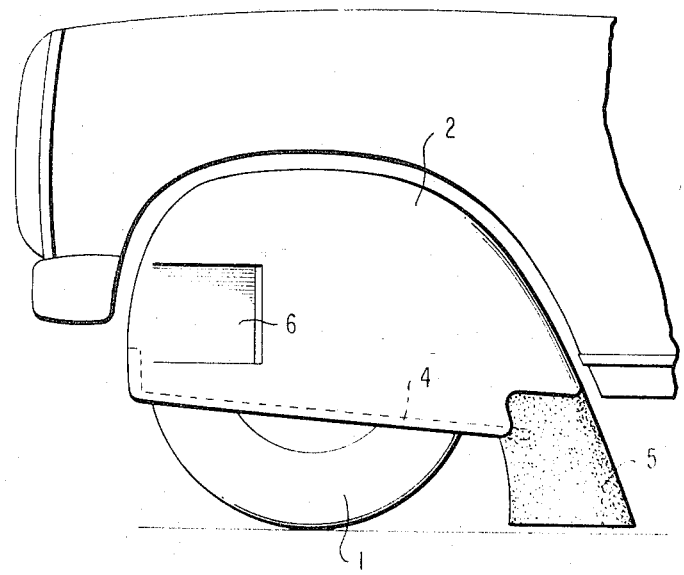

United States Patent [19]
Wilfert et al.

[11] 3,784,226
[45] Jan. 8, 1974

[54] DEVICE FOR REDUCTION OF SOILING OF MOTOR VEHICLES

[75] Inventors: Karl Wilfert, Gerlingen-Waldstadt; Hans Gotz, Sindelfingen, both of Germany

[73] Assignee: Daimler-Benz Aktiengesellschaft, Stuttgart-Unterturkheim, Germany

[22] Filed: Sept. 22, 1972

[21] Appl. No.: 291,185

[30] Foreign Application Priority Data
Sept. 24, 1971 Germany............... P 21 47 750.9

[52] U.S. Cl........ 280/157, 280/153 A, 280/154.5 R
[51] Int. Cl............................................. B62b 9/16
[58] Field of Search............ 280/157, 154.5, 153 R, 280/152, 153 A

[56] References Cited
UNITED STATES PATENTS
| | | | |
|---|---|---|---|
| 1,462,152 | 7/1923 | Smith | 280/157 |
| 1,613,443 | 1/1927 | D'Amato | 280/157 UX |
| 1,899,937 | 3/1933 | Brown | 280/152 |
| 2,700,553 | 1/1955 | Ludwig et al. | 280/153 R |
| 3,198,545 | 8/1965 | McDaniel | 280/154.5 R |

FOREIGN PATENTS OR APPLICATIONS
| | | | |
|---|---|---|---|
| 139,157 | 10/1934 | Austria | 280/153 A |

*Primary Examiner*—Leo Friaglia
*Attorney*—Paul M. Craig, Jr. et al.

[57] ABSTRACT

A wheel casing for reducing the self-soiling and the external soiling of motor vehicles so secured that it is able to follow the spring movements and possibly also any steering movements; on the inside of the casing, on each side thereof, is provided a water-collecting groove extending at an inclination from the front downward toward the rear and an apron consisting of elastic, coarse-porous material is arranged at the rear end of the casing, which extends down to a position very close to the road surface.

12 Claims, 2 Drawing Figures

DEVICE FOR REDUCTION OF SOILING OF MOTOR VEHICLES

The present invention relates to a device for reducing the self-soiling and external soiling of motor vehicles whose wheels are covered off over the largest part of their height with a covering or casing that is so secured that it follows the spring and possible also the steering movements of the wheels.

Heretofore all motor vehicles exhibit during the drive on wet and dirty roads a turbulent wake or trailing airstream adjoining the rear end and containing dirty water, into which the following vehicles practically "immerse." The soiling of these vehicles conditioned thereby considerably reduces the visibility safety. Additionally, the dirty water turbulently thrown up by a driving vehicle, leads also to a more or less strong soiling, for example, of the rear lights of the vehicle itself, which in turn may lead to an endangering of the following vehicles.

Cause for the described soiling are on the one hand, dirt particles centrifuged off by the tires, and on the other, dirt particles sprayed off in the course of the rotation of the wheel and sucked-off by the air stream.

The present invention is therefore concerned with the task to so collect and conduct away the soiled water centrifuged up by the tires that it no longer can be seized by the air flow and sprayed off.

As solution to the underlying problems, a device of the type described above is proposed in which, according to the present invention, a water collecting groove extending at an inclination from in front downward toward the rear is provided on the inside of each casing on each side thereof and whereby an apron consisting of elastic, coarse-porous material, such as skeleton-foam, is arranged at the rear portion of each casing, which extends up to directly above the road surface.

The casings or coverings are appropriately constructed two-partite and the separating joints extend respectively in a vertical wheel longitudinal plane.

The connection of the two parts of each casing can take place by rapid connecting means of conventional construction in order to enable possibly a rapid removal or exchange of the casings.

In order to assure an adequate cooling of the brakes of the vehicles, the casings are advantageously provided with air guide channels or ducts for ventilating the brakes.

According to a preferred embodiment of the present invention, the upper edge of the casing extends—as viewed from the side—in the rearward area thereof approximately parabolically shaped and the rear edge of the apron is matched to this configuration. This shape and configuration of the casing and of the apron permits, for example, a driving over curbstone edges in any direction and permits a turning-in of the apron also when driving backwards over obstacles without causing the aprons to thereby abut at the tires and to be damaged or torn off as a result thereof.

Accordingly, it is an object of the present invention to provide a device for reducing the soiling of motor vehicles which avoids by simple means the aforementioned shortcomings and drawbacks encountered in the prior art.

Another object of the present invention resides in a device for reducing the self-soiling and the externally caused soiling of motor vehicles which is simple in construction, easy to install and simple to service.

A further object of the present invention resides in a device reducing the soiling of motor vehicles, when driving on wet roads, which considerably increases the road safety by lessening the soiling of the rear lights of a motor vehicle as well as the soiling of the windshield and front lights of the next following vehicle.

A still further object of the present invention resides in a device for reducing the soiling of motor vehicles which so collects the soiled water and conducts the same away that it no longer can be caught by the air stream in the wake of the vehicle and be sprayed off thereby.

Another object of the present invention resides in a device of the aforementioned type which not only can be easily installed but also assures adequately cooling of the brakes.

Still a further object of the present invention resides in a device for reducing the soiling of motor vehicles by rain water and dirt particles thrown up by the running wheels which nevertheless permits a driving over obstacles without jeopardizing the device.

Figure 2:
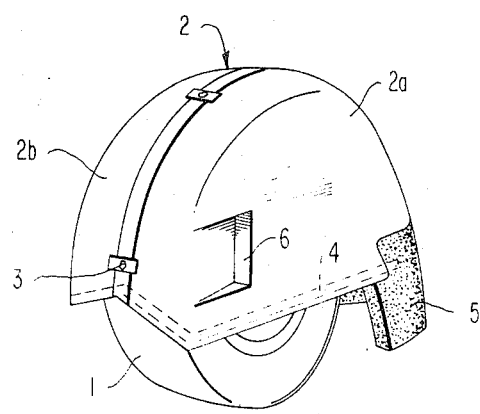

These and other objects, features and advantages of the present invention will become more apparent from the following description when taken in connection with the accompanying drawing which shows, for purposes of illustration only, one embodiment in accordance with the present invention, and wherein:

FIG. 1 is a side view of the front part of a passenger motor vehicle with a front wheel enclosed in accordance with the present invention; and FIG. 2 is a perspective view from above and in front of the front wheel according to FIG. 1.

Referring now to the drawing wherein like reference numerals are used throughout the two views to designate like parts, the front wheel 1 illustrated in the drawing of a passenger motor vehicle (not shown) is provided with a covering or casing generally designated by reference numeral 2 that consists of two parts 2a and 2b. The separating joint between the parts 2a and 2b of the casing 2 extends thereby in a vertical wheel longitudinal plane. The connection of the two parts 2a and 2b takes place by way of schematically indicated rapid connecting means 3 of conventional construction and therefore not illustrated and described in detail. Within the area of the lower edge of each of the two parts 2a and 2b is provided a water-collecting groove 4 extending at an inclination from in front downwardly toward the rear, which catches the soiled water turbulently thrown up on the inside of the casing 2 and conducts the same to an apron 5 that is secured at the rear portion of the casing 2.

The operation of the apron 5 which consists of an elastic, air-permeable, coarse-porous material of any conventional type such as, for example, of skelton-foam, is as follows:

The soiled water runs off on the inside of the coarse-porous material of the apron 5 onto the road surface and is no longer seized by the air stream. The air flow is deflected only insignificantly by the apron 5 and flows decelerated through the porous apron 5 without thereby tearing along small soiled-water particles. Dirt particles securely adhering at the apron 5 again fall out of the same during vibrations as are caused during the normal driving operation.

The casing 2 is provided with appropriate air-guide channels 6 to assure adequate ventilation of the wheel brakes (not shown). Furthermore, the upper edge of the casing 2 extends in its rear portion approximately parabolically shaped—as viewed in side view—and the read edge of the apron 5 is matched to this configuration as can be seen in particular from FIG. 1.

In conclusion, it may also be stated that the covering or casing 2 can be made of a specific light-weight material and may then have a weight of the order of magnitude of about 2 kp. This weight, however, lies within the tolerance range of different tire sizes and tire rims of a vehicle type so that the driving comfort is not influenced. The casing 2 is connected with the other parts in a conventional manner, known as such and forming no part of the present invention so that a detailed description thereof is dispensed with herein for the sake of brevity.

While we have shown and described only one embodiment in accordance with the present invention, it is understood that the same is not limited thereto, but is susceptible of numerous changes and modifications as known to those skilled in the art, and we therefore do not wish to be limited to the details shown and described herein but intend to cover all such changes and modifications as are encompassed by the scope of the appended claims.

What we claim is:

1. A wheel casing means for reducing the self-and external soiling of motor vehicles and adapted to overlie and cover the top and major portions of the sides thereof, said casing means adapted to be secured to the wheel mounting such that it follows the wheel movements including the steering movements, the inside of said casing means having a water-collecting groove means being downwardly inclined from front to rear, and apron means consisting of an elastic, coarse-porous material mounted at the rear end of said casing means and extending downwardly to a position just above the road surface.

2. A wheel casing means according to claim 1, characterized in that a groove means is provided on each side of a respective casing means.

3. A wheel casing means according to claim 2, characterized in that the apron means consists of skeleton-foam material.

4. A wheel casing means according to claim 2, characterized in that the casing means is constructed two-partite and the separating joint therebetween extends in a vertical wheel longitudinal plane.

5. A wheel casing means according to claim 4, characterized in that both parts of the casing means are connected with each other by rapid connecting means.

6. A wheel casing means according to claim 5, characterized in that the casing means are equipped with air-guide channel means for ventilating vehicle brakes.

7. A wheel casing means according to claim 6, characterized in that the upper edge of the casing means along its rear portion is approximately parabolically shaped and the rear edge of the apron means is a continuation of said parabolic contour.

8. A wheel casing means according to claim 7, characterized in that the apron means consists of skeleton-foam material.

9. A wheel casing means according to claim 1, characterized in that the casing means are equipped with air-guide channel means for ventilating vehicle brakes.

10. A wheel casing means according to claim 1, characterized in that the upper edge of the casing means along its rear portion is approximately parabolically shaped and the rear edge of the apron means is a continuation of said parabolic contour.

11. A wheel casing means according to claim 1, characterized in that the casing means is constructed two-partite and the separating joint therebetween extends in a vertical wheel longitudinal plane.

12. A wheel casing means according to claim 11, characterized in that both parts of the casing means are connected with each other by rapid connecting means.

* * * * *